United States Patent
Maehner et al.

(10) Patent No.: US 7,568,385 B2
(45) Date of Patent: Aug. 4, 2009

(54) DEVICE AND METHOD FOR TESTING A TIRE, IN PARTICULAR BY MEANS OF AN INTERFEROMETRIC MEASURING METHOD

(75) Inventors: Bernward Maehner, Landsberger Str. 51, 82205, Gilching (DE); Stefan Dengler, Mauswiesenweg 10, 75365, Calw-Stammheim (DE)

(73) Assignees: Bernward Maehner, Gilching (DE); Stefan Dengler, CAlw-Stammheim (DE)

(*) Notice: Subject to any disclaimer, the term of this patent is extended or adjusted under 35 U.S.C. 154(b) by 0 days.

(21) Appl. No.: 12/032,325

(22) Filed: Feb. 15, 2008

(65) Prior Publication Data
US 2008/0202229 A1 Aug. 28, 2008

(30) Foreign Application Priority Data
Feb. 16, 2007 (DE) .................. 10 2007 007 816
Feb. 23, 2007 (DE) .................. 10 2007 009 040

(51) Int. Cl.
*G01M 17/02* (2006.01)

(52) U.S. Cl. ....................................................... 73/146
(58) Field of Classification Search ................. 73/146; 356/458; 378/61
See application file for complete search history.

(56) References Cited

U.S. PATENT DOCUMENTS

| 4,258,567 | A  | * | 3/1981 | Fisher, III ..................... 73/146 |
| 5,060,250 | A  | * | 10/1991 | Kwee et al. .................... 378/61 |
| 6,100,923 | A  | * | 8/2000 | Sass et al. ...................... 348/94 |
| 6,907,777 | B2 | * | 6/2005 | Weiss ........................... 73/146 |
| 7,360,410 | B2 | * | 4/2008 | Steinbichler et al. .......... 73/146 |
| 2003/0188574 | A1 | * | 10/2003 | Weiss ........................... 73/146 |
| 2008/0158569 | A1 | * | 7/2008 | Maehner et al. ............. 356/458 |

FOREIGN PATENT DOCUMENTS

| DE | 4231578 A1 | 3/1994 |
| DE | 4232201 A1 | 3/1994 |
| DE | 68922855 T2 | 11/1995 |
| DE | 19944314 A1 * | 4/2001 |
| DE | 20314939 U1 | 1/2004 |
| EP | 1014036 B1 | 1/2004 |
| EP | 1043578 B1 | 10/2004 |
| GB | 2395791 A * | 6/2004 |

* cited by examiner

*Primary Examiner*—Andre J Allen
(74) *Attorney, Agent, or Firm*—Stephen B. Salai, Esq.; Brian B. Shaw, Esq.; Harter Secrest & Emery LLP (57) ABSTRACT

A device for testing a tire with two sidewalls and a tread portion in particular by means of an interferometric measuring method, is provided with a measuring unit with which the tire can be scanned to generate a measurement result, and with a positioning means for the measuring unit. The measuring unit comprises at least three measuring heads. The first measuring head and the second measuring head are used to scan the outer surface of the sidewalls, whereas the third measuring head is used to scan the inner surface of at least the tread portion. The device enables a tire to be fully tested quickly.

30 Claims, 10 Drawing Sheets

1st testing run inner surface outer surface

2nd testing run 23    22    21

DEVICE AND METHOD FOR TESTING A TIRE, IN PARTICULAR BY MEANS OF AN INTERFEROMETRIC MEASURING METHOD

BACKGROUND OF THE INVENTION

1. Technical Field

The present invention relates to a device and a method for testing a tire, in particular by means of an interferometric measuring method. The object intended to be tested is a tire, but other components could also be tested using the device according to the invention. The measuring method with which the tire is tested is in particular an interferometric measuring method. However, it is also possible to implement other non-destructive measuring methods such as, for example, ultrasound testing or radiographic testing using x-rays. The device has a measuring unit by means of which the tires can be scanned in order to produce a measurement result. The device is also provided with a positioning means to enable the measuring unit to be positioned in a measuring position and to be oriented in a measuring direction.

2. Description of Related Art

Tires or other components that are under load when in use are subjected to material tests for the purposes of quality control and for the reduction of safety risks; these material tests enable faulty areas, known as defects, to be identified. Above all, when used tires are to be remoulded, as a rule a non-destructive type of testing is used which enables relatively rapid series examinations.

Optical measuring methods are frequently to be found in industrial practice such as for example holography or shearography, also commonly known as speckle-pattern-shearing interferometry. Shearography is a relative interferometric measuring method that produces a result image which shows the difference between two chronologically staggered conditions of the test object. In order to generate the resulting digital image generally used nowadays in view of the increasing application of electronic image sensors such as CCD- or CMOS-sensors, it is thus necessary to change the condition of the test object between two measurements by mechanical, thermal or pneumatic forces. To this end, known devices are provided with a pressure chamber which is either evacuated or pressurized so that the test object inside the chamber is deformed as a result of the pressure change and thus transforms from a first reference state to a second measurable state.

In contrast to holography, shearography does not determine the deformation on the surface of a test object but rather measures the gradients of deformation. This is because shearography makes use of what is known as a shearing element which makes use of shear optics such as for example an optical wedge, an optical biprism or a Michelson interferometer, which generates image duplication. As a result of the shearing element, two slightly spatially-shifted images of the test object are produced and superimposed so as to generate an interferogram from the interference obtained. The shearogram characterized by the gradients of the deformation is created by subtraction of the intensities of the interferograms obtained in the reference state and the measured state. The shearogram indicates whether the position of a point in relation to a neighboring point has changed as a result of the deformation of the test object. If it has, then this positional difference leads to a local change in the intensity distribution which gives information about defects. Interferometric measuring methods which are based on this speckle-interferometry are described in DE 42 31 578 A1 and EP 1 014 036 B1.

The devices employed to test a test object by means of an interferometric measuring method generally have at least one measuring head which is provided with a lighting unit and an image-acquisition unit. The lighting unit frequently consists of a coherent-light-emitting laser or laser diode. The image acquisition unit is usually a camera provided with an image sensor, i.e. a light-sensitive semiconductor sensor, for example a CCD- or CMOS-sensor. To achieve meaningful measurement results it is necessary to co-ordinate the camera's optical angle and the section of the test object that is to be tested. Generally, such co-ordination is achieved by positioning the measuring head in a measuring position and orienting it in an observation direction which ensure, on the one hand, that the section of the test object to be tested lies completely within the optical angle of the camera and, on the other hand, that sections to be tested and measured in sequence overlap each other sufficiently to enable a complete and thorough test. The measuring position and the observation direction of the measuring head depend on the dimensions of the test object. Accordingly, a device is known from EP 1 284 409 A1 which enables the test object to be measured optically, for example by means of what are called light sections, so that the measuring head can be positioned and oriented depending on the data acquired in this way.

A tire testing device in which a tire to be tested without a wheel or rim is placed in a pressure chamber in a lying position is disclosed in EP 1 043 578 B1. The tire-testing device is provided with several measuring heads which can be positioned at a prescribed distance from the inner surface of the tire in order to test from the inside the substructure of the tire, i.e. the carcass, the belt frequently incorporated between the carcass and the tread portion as well as the sidewall of the tire. The measuring heads each have a lighting unit and an image acquisition unit and are positioned at an angle to each other so that different sections of the tire can be tested at the same time in order to perform the test comparatively quickly.

The measuring heads are connected to a positioning means which makes it possible to move the measuring heads from a park position outside the tire, which enables the tire for testing to be changed, into a measuring position inside the tire. For this purpose the positioning means is provided with an arm that is movable around the longitudinal axis of the tire and on which the measuring heads are mounted. To enable the measuring heads to be brought into the necessary measuring position and into the desired observation direction, the measuring heads are movable in the radial direction of the tire and they can be swiveled around a pivot axle mounted on the arm.

The known tire-testing device has the disadvantage that, as a result of the arrangement of the measuring heads in the measuring position within the tire, only tires can be tested which have a relatively large internal diameter. Moreover, the arrangement of the measuring heads around a pivot axle, which is absolutely necessary in order to examine fully the internal surface of the tire, has proved to be a disadvantage. The pivotal arrangement of the measuring heads requires a high level of mechanical effort and of control technology, which is associated with cost-intensive production.

SUMMARY OF THE INVENTION

The object of the invention is to provide a device and a method as well as a testing arrangement for testing a tire which enables the testing of the tire to be performed quickly and fully.

This object is accomplished by the device according to Claim 1, a testing arrangement according to Claim 24 and a method according to Claim 25. Preferred embodiments of the invention are defined in the claims 2 to 23 and 26 to 30.

The device according to the invention for testing a tire has a measuring unit by means of which the tire is scanned to generate a measurement result. The measuring unit has at least three measuring heads which could be configured for example as is described in EP 1 014 036 B1, in order to test the tire using an interferometric measurement procedure. In principle, it is also possible for the measuring head to be configured in a way to enable other non-destructive testing procedures to be carried out, such as for example ultrasound testing or radiographic testing using x-rays. The device according to the invention also has a positioning means which enables each of the measuring heads to be positioned in its measuring position and oriented in its measuring direction.

The positioning means is so designed that at least two of the measuring heads of the measuring unit can be oriented in the measuring direction thus enabling the outer surface of the sidewalls of the tire to be scanned. The positioning means is also designed so that at least one of the measuring heads of the measuring unit can be oriented in one measuring direction which enables the inner surface of the tire, in the area of the tread portion at least, to be scanned.

The method according to the invention enables the tire to be tested quickly and fully provided the measuring unit has at least three measuring heads. The first measuring head and the second measuring head are positioned and oriented so that the outer surface of the sidewalls can be scanned. By contrast the third measuring head is positioned and oriented so that the inner surface at least of the tread portion of the tire can be scanned. In a first testing stage, the tire is turned intermittently relative to the measuring head around the axis of rotation and is scanned successively in sections by the measuring heads. In this procedure the first measuring head scans one half of the section to be measured on the outer surface of the first sidewall, whereas the second measuring head scans the other half of the section to be measured on the outer surface of the first sidewall. The third measuring head scans one half of the section to be measured on the inner surface. After the first testing stage has been completed, the tire is turned over and subsequently, in a second testing stage, it is turned intermittently relative to the measuring heads around the axis of rotation and is scanned in sections by the measuring heads. The first measuring head then scans one half of the section to be measured on the outer surface of the second sidewall while the second measuring head scans the other half of the section to be measured on the outer surface of the second sidewall. The third measuring head scans the remaining half of the section to be measured on the inner surface.

Accordingly, on completion of the second testing procedure the outer surface of both the first and the second sidewalls and the inner surface of at least the tread portion of the tire have been completely scanned and thus the tire has been fully tested. The invention makes use of the knowledge that a full test of the tire, that is to say a bead-to-bead test, can be achieved by testing the sidewalls from the outside and the tread portion from the inside. In doing this the sidewalls are tested using two measuring heads, whereas only one measuring head is required for scanning the inner surface. The invention is of particular significance when the tire is to be tested in a lying position and consequently it is necessary to turn the tire over in order to be able to test from the outside the sidewall that lay underneath during the first stage of the test. If, as in such a case, two testing stages are necessary, then the division of the test of the tread portion over the two testing stages is particularly advantageous. As a result of this division, the tread portion can be fully tested by one single measuring head in the same time that it takes the two measuring heads to scan the sidewalls from the outside. In contrast to the prior art, as is known from EP 1 043 578 B1, with the device according to the invention it is possible to test tires with a comparatively low inner diameter.

Although it may follow from the above that three is the number of measuring heads that is optimal for testing most types of tires, the device according to the invention can also be fitted with more than three measuring heads, depending on requirements. If, for example, a relatively large tire such as is known as an Off-The-Road (OTR) tire is to be tested, it can be expedient to use not two but four, or more, measuring heads to scan the sidewalls from the outside in order to perform the test in a short time. The advantage inherent of the method, which is to use the two test stages resulting from the tire flip for distributing the running surface test over the two test stages, appears when the arrangement of the measuring heads that test the outside of the sidewalls and the arrangement of the measuring heads that test the inside of the running surface are chosen so that in a test stage the entire outer surface of the sidewalls and half of the inside surface of the running surface is being tested.

A further reason for envisaging more than three measuring heads may be to provide redundancy which will ensure a fail-safe configuration. What is more, it can sometimes suffice if the tire is not tested in its entirety but if merely the area of the tread portion is tested. To ensure a short testing time in such a case, the measuring unit of a preferred embodiment of the device according to the invention should be provided with a fourth measuring head oriented in a fourth measuring direction to scan at least the inner surface of the tread portion. The fourth measuring direction and the third measuring direction, in which the third measuring head is oriented, run preferably in a radial direction of the tire and for the purpose mentioned are preferably oriented in mutually opposing directions. Depending on the application, it is also possible for the third and fourth measuring directions to extend at an angle to the mid-level of the tire which would correspond to the symmetry plane in a symmetrically constructed tire.

The first measuring direction and the second measuring direction run preferably in an axial direction of the tire. Depending on the application, however, it is also possible for the first and second measuring directions to be at an angle to the axial plane extending in the axial direction.

One test that coincides to a very large extent with the method according to the invention can be applied when, as presented above, the tire has to be tested in a lying position. In this case the axial direction is vertical and the radial direction is horizontal. However, depending on the case, it can be expedient to test the tire in an upright position, so that the axial direction is horizontal, as is known for example from DE 203 14 939 U1.

In a preferred embodiment of the device according to the invention at least one of the measuring heads is arranged rigidly in relation to the measuring direction. It is preferable for all the measuring heads to be arranged rigidly with regard to their corresponding measuring direction. The rigid arrangement of the measuring heads, i.e. without the possibility to swing the measuring heads in the measuring position around a pivotal axis that is orthogonal to the measuring direction, has the advantage of being a simple and low-cost configuration. In contrast to the prior art, as known for example from EP 1 043 578 B1, the rigid arrangement of the measuring heads also offers the advantage of being a low-wear and low-maintenance configuration.

In an alternative embodiment of the device according to the invention at least one of the measuring heads, preferably all the measuring heads, can be rotated around an axis that is orthogonal to the measuring direction. With a view to a simple and universal configuration it has proved advantageous, and sufficient, if only one of the measuring heads can be rotated around the axis.

In a preferred embodiment of the device according to the invention the measuring head can be swiveled between a first measuring position and a second measuring position. To achieve an accurate and a reproducible swivel movement, it is advantageous for the measuring head to be rotatable from the first measuring position into the second measuring position against the effect, for example, of the return force generated by a spring element. The movement from the first measuring position into the second measuring position can be effected, for example, by a pneumatically operated actuator.

It is preferable for the measuring head in the first measuring position to be oriented essentially in the measuring direction extending in the axial direction of the tire, and in the second measuring position in the measuring direction extending in the radial direction of the tire. In the first measuring position the measuring head can be used to test the sidewalls of the tire from the outside. In the second measuring position the measuring head can be used to test the tread portion of the tire from the inside. If the first measuring head or the second measuring head is the measuring head that is rotatably mounted, then this head in the second position together with the third measuring head can scan the tread portion in a comparatively short test if no complete test of the tire is necessary. The rotatable arrangement of only one of the measuring heads thus ensures a universal applicability of the device according to the invention.

In a further preferred embodiment of the device according to the invention the measuring head can be swiveled in such a way that in the first measuring position it is oriented in a measuring direction coincident with the radial direction of the tire and in the second measuring position it is oriented at a prescribed angle to this radial direction. Such a configuration lends itself particularly to the testing of tires of a comparatively large width when, as a result of the size, the tread portion cannot be covered in its entirety by the optical angle of the measuring head. By turning the measuring head through the prescribed angle, it is possible to record what is known as a 'Split-Crown Shot', i.e. to orient the measuring head so that part of the tread portion as well as the shoulder section with the transition to the sidewall can be captured in the optical angle of the measuring head. For this purpose it has proved advantageous for the prescribed angle relative to the equatorial plane of the tire to be between 0° and ±30°, preferably between 0° and ±15°. If the inner surface of the tire is tested using a split-crown shot, then the advantages of the device according to the invention come to bear when the inner surface of the tire is scanned simultaneously by two measuring heads.

In a further preferred embodiment the device according to the invention has a pressure chamber in which the tire to be tested can be subjected to a prescribed pressure. The pressure chamber enables an interferometric, in particular a shearographic, measuring procedure to be properly carried out.

It is preferable for the device according to the invention also to have a sub-frame on which the tire can be positioned during the test. The sub-frame can also serve to minimize any vibrations, such as airborne and structure-borne vibrations, which may falsify the measurement results. It is expedient for the positioning means and/or the pressure chamber to be supported on the sub-frame.

In another preferred embodiment of the device according to the invention at least one of the measuring heads is rotatable in the axial direction and/or in the radial direction by means of the positioning means. In this regard it has proved advantageous for the positioning means to have at least one axial adjustment unit which can move the measuring head in the axial direction and at least one radial adjustment unit which can move the measuring head in the radial direction. It is expedient for each of the measuring heads to be assigned an axial adjustment unit and a radial adjustment unit so that, quite independently of each other, the measuring heads can be positioned in their individual measuring positions and oriented in their individual measuring directions. The adjustment units are configured, for example, as linear guides or linear motors and can be linked to each other. A simple and low-cost configuration can be achieved if at least two radial adjustment units and/or at least two axial units are coupled to each other and in such a way that they can be driven by a common drive.

It is also advantageous if the measuring unit in relation to the tire can swivel around an axis of rotation or roll axis extending in the axial direction of the tire so that in this way the tire can be fully scanned in the circumferential direction. In this regard it is also advantageous to provide the sub-frame with a rotation facility that enables the tire to be turned around the axis of rotation. Alternatively or additionally, the relative movement between the tire and the measuring unit can be achieved by means of a rotatable configuration of the positioning means. However, this latter configuration involves considerable technical effort as well as requiring a great deal of space.

In order to carry out an interferometric, and in particular a shearographic, measuring method, it is advantageous for the measuring units to each include a lighting element which can illuminate the tire to be tested, a shearing element which uses the light beams reflected back from the tire to obtain interference and an electronic image sensor which is arranged within the optical path of the shearing element and which records the interfering light beams. The lighting element, composed for example of laser diodes, can be either an integral constituent of the measuring head or can be separate from it.

With a view to a practical configuration, it is also advantageous for the device according to the invention to have a control and evaluation unit by means of which the measuring unit and/or the positioning means and/or the rotation facility and/or the pressure prevailing in the pressure chamber can be controlled and the measurement results can be evaluated. In this regard it has proved to be advantageous for the control and evaluation unit to be provided with an image acquisition system, i.e. a device known as a frame- or video-grabber, by means of which the images captured by the measuring head's image sensor can be recorded. For practical purposes, the frame grabber is provided with several channels in order to record simultaneously the measuring heads' images. A particularly economical configuration is for the measuring unit to have three measuring heads and, accordingly, a three-channel frame grabber is required for simultaneously recording the images. Three-channel frame grabbers are used for the processing of video signals from conventional color cameras and can thus be obtained on the market at low-cost. Depending on the application it can also be appropriate not to record the image signals from the image sensor simultaneously but rather sequentially so that, for example, when there is a large number of measuring heads it is possible to use a simple and low-cost frame grabber.

In a preferred embodiment of the method according to the invention, the sidewalls and the tread portion of the tire can each be divided up into an even number of sections to be measured. A division into eight measurement sections has proved to be suitable for most types of tires.

In a particularly advantageous embodiment of the method according to the invention the first test stage is carried out on one test device and the second test stage is carried out on a second device. Such a procedure enables tire testing to be performed exceedingly quickly.

In another preferred embodiment of the method according to the invention the sections to be measured are scanned simultaneously by the measuring heads whilst, for this purpose, the tire is subjected to a prescribed pressure in a pressure chamber so that the measuring heads can record interferometrically any deformation of the tire resulting from a change of pressure within the pressure chamber.

BRIEF DESCRIPTION OF THE DRAWING FIGURES

Details and further advantages of the invention can be seen from the following description of preferred embodiments. These embodiments serve merely as exemplary schematic drawings and show in:

FIG. 1c, a depiction of the section of a tire measured by the measuring heads of the test device according to FIG. 1a;

FIG. 2b, a depiction of the section of a tire measured by the measuring heads of the test device according to FIG. 2a;

DETAILED DESCRIPTION OF THE INVENTION

Figure 1A:
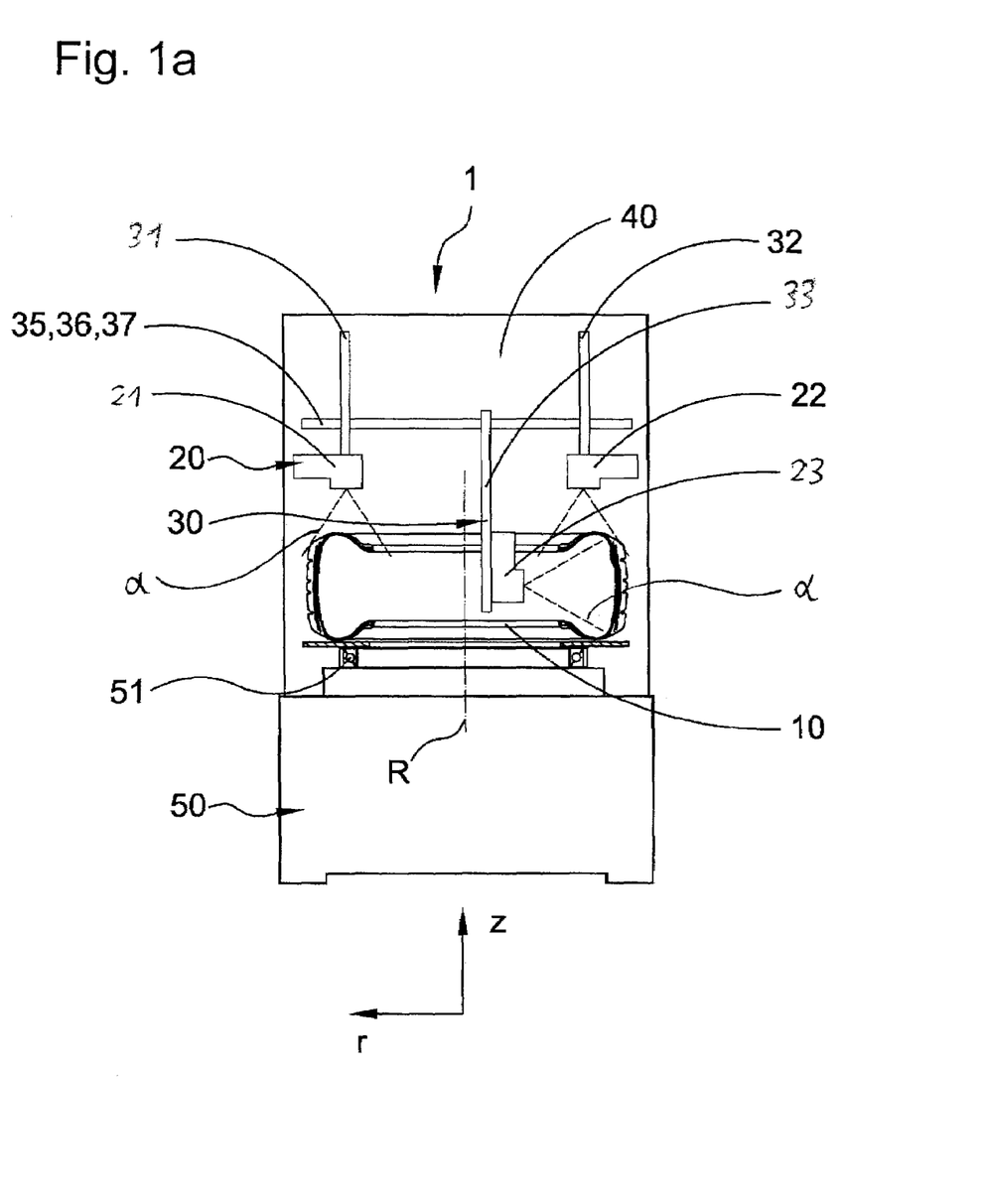
FIG. 1a, a side view of a first embodiment of a device for testing a tire which has three measuring heads.

The device 1, shown in FIG. 1a, is used to test a tire 10 by means of an interferometric measuring method. The test device 1 has a measuring unit 20 which can scan the tire 10 to generate a measurement result. The measuring unit 20 includes three measuring heads 21, 22, 23, which are each configured in the manner known from EP 1 014 036 B1 in order to test the tire 10 by means of an interferometric, in particular a shearographic, measuring method. Accordingly, each of the measuring heads 21, 22, 23 has a lighting element to illuminate the tire 10 and which is made up, for example, of several laser diodes. Each of the measuring heads 21, 22, 23 also has a shearing element which causes the light beams reflected from the tire 10 to produce interference. The shearing element for example is made up of a beam divider, a movable mirror and a stationary mirror. Each of the measuring heads 21, 22, 23 also has a camera which is provided with an electronic image sensor, for example a CCD- or CMOS-sensor. The image sensor is arranged within the optical path of the shearing element and serves to record the interfering light beams.

As can also be seen from FIG. 1a, the test device 1 has a positioning means 30 which can position each of the measuring heads 21, 22, 23, in a measuring position and can orient it in a measuring direction. For this purpose, the positioning means 30 includes axial adjustment units 31, 32, 33, which enable each of the measuring heads 21, 22, 23 to be moved in an axial direction z of the tire 10. In addition, the positioning means 30 has radial adjustment units 35, 36, 37, which enable each of the measuring heads 21, 22, 23, to be moved in a radial direction r of the tire 10, which is orthogonal to the axial direction z. Both the axial adjustment units 31, 32, 33 and the radial adjustment units 35, 36, 37 are configured, for example, as linear guides or linear motors and thus enable the measuring heads 21, 22, 23 to be moved in a straight line in the axial direction z and in the radial direction r. One axial adjustment unit 31, 32, 33 and one radial adjustment unit 35, 36, 37 are assigned to each measuring head 21, 22, 23 and are linked to each other. Thus, for example, the adjustment units 31, 35 assigned to the measuring head 21 are linked to each other in such a way that the adjustment unit 31 can be moved in a radial direction r by the adjustment unit 35. What is more, adjustment units 31, 32, 33, 35, 36, 37 assigned to different measuring heads 21, 22, 23 can also be linked to each other in order, for example, to reduce the number of drives and thus to ensure low-cost configuration. In this way, for example, the axial adjustment units 31, 32 can be linked to each other so that they are moved in the axial direction z by a common drive.

The test device 1 also has a pressure chamber 40 in which the tire 10 can be subjected to a prescribed pressure. The pressure prevailing in the pressure chamber 40 can be greater or smaller than normal atmospheric pressure. A safety valve (not shown) ensures than an excessively high or low pressure, which would lead to a deformation or damage to the pressure chamber 40, cannot occur. With regard to shearographic measuring methods it has proved expedient to choose atmospheric pressure as the reference condition and to foresee as the measuring condition a lower pressure to which the pressure chamber 40 can be evacuated.

The device also comprises a sub-frame 50 on which the tire 10 is placed during the test and on which the positioning means 30 is supported. As can be seen in FIG. 1a, the tire 10 can be placed in a lying position or, as is known from DE 203 14 939 U1, in an upright position. If the tire 10 is placed in the lying position, the axial direction z will extend vertically and the radial direction r will extend horizontally. The sub-frame 50 is provided with a rotation device 51 which enables the tire 10 to be swiveled around the axis of rotation R. The axis of rotation R extends in the axial direction z.

Figure 1B:
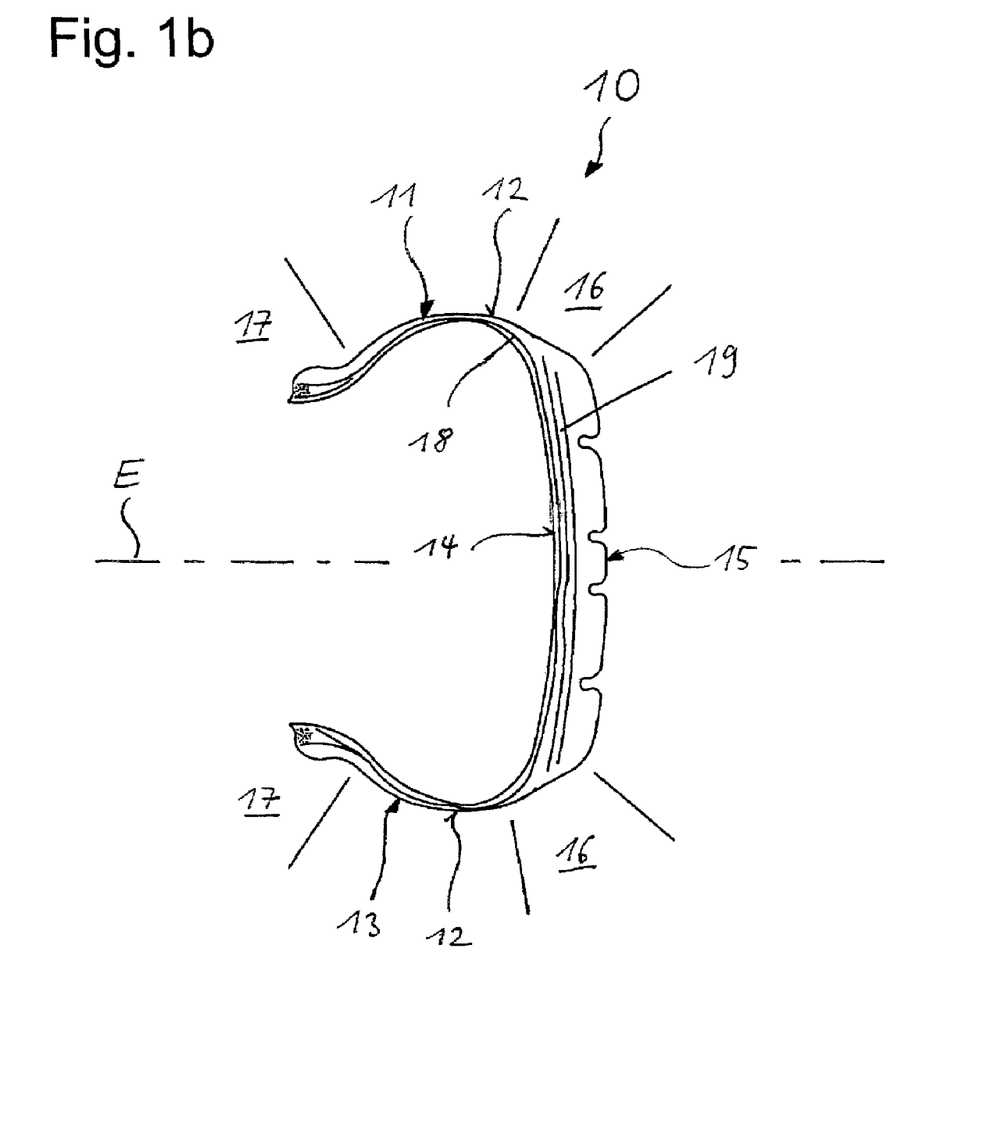
FIG. 1b, a cross-section of a tire.

As can be seen from FIG. 1b, a tire 10 generally has two sidewalls 11, 13 and a tread portion 15 which links the two sidewalls 11, 13 to each other. The transitional area from the tread portion 15 to the sidewalls 11, 13 is generally described as the shoulder section or shoulder 16. The free, often thick end of the sidewalls 11, 13 ensures a tight connection between a tire 10 and a rim of a wheel and is referred to as a rule as the bead core or bead 17. The substructure of the tire 10 is the carcass 18 which is generally made up of one or a number of plies consisting of woven layers of synthetic fibers or steel cords embedded in rubber. The carcass 18 is the decisive structure of the tire 10 that provides its rigidity and it is complemented by the belt structure 19 that underlies the tread portion 15.

To test the tire 10 using a shearographic measuring method, first of all the measuring heads 21, 22, 23 have to be positioned in their corresponding measuring positions and oriented in the measuring direction by the adjustment units 31, 32, 33, 35, 36, 37. The measuring heads 21, 22 that are used to scan the outer surface 12 of the sidewall 11 that lies uppermost in the first test stage are oriented in the measuring direction extending in the axial direction z and are positioned in a measuring position in which the optical angle α of each of the measuring heads 21, 22 scans completely one of the, in this case, eight measurement segments or sections into which the outer surface 12 is divided. By contrast, the measuring head 23 used to scan the inner surface 14 of the tread portion 15 is oriented in a measuring direction extending in the radial direction r and is positioned in a measuring position in which the optical angle α of the measuring head 23 completely scans one of the, in this case, eight measurement sections into which the inner surface 14 is also divided. The measurement sections on the outer surface 12 and on the inner surface 14 are illuminated by the corresponding lighting elements of each of the measuring units 21, 22, 23. The light beams reflected from the surface of the tire 10 are recorded by a lens that is provided on each of the measuring heads 21, 22, 23 and captured on the corresponding shearing element of the measuring heads 21, 22, 23 and interference is obtained with the help of the shearing element. The interfering light beams are recorded by the corresponding image sensors of the measuring heads' cameras arranged in the optical path of the shearing element in order to generate an interferogram. The measuring heads 21, 22, 23 are connected to a control and evaluating unit (not shown) which has a multi-channel frame grabber for simultaneously recording the images, i.e. interferograms, captured by the corresponding measuring head's 21, 22, 23 image sensor. The interferograms are processed in the control and evaluation unit, for example, to compose, from different conditions of the tire 10 arising as a result of a change of pressure in the pressure chamber 40, a shearogram showing the deformation at the surface of the tire 10. The control and evaluation unit also serves to control the positioning means 30, the rotation device 51 and the pressure prevailing in the pressure chamber 40.

Figure 1C:
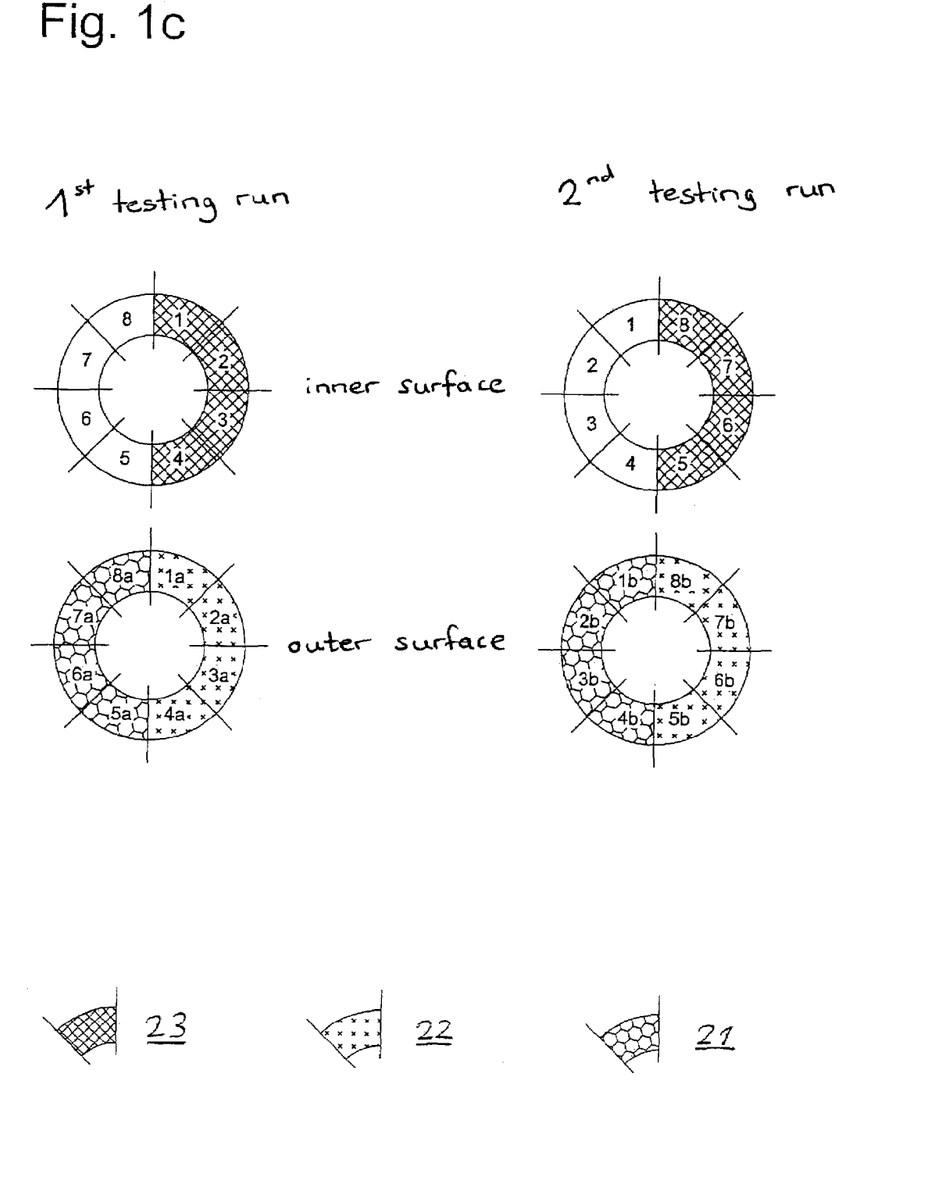

As can be seen in FIG. 1c, during the first test stage all the measurement sections on the outer surface 12 of the uppermost sidewall 11 and half of the measurement sections of the inner surface 14 of the tread portion 15 are tested. In this process the measurement sections 1a to 4a on the outer surface 12 are successively scanned by the measuring head 22 and the measurement sections 5a to 8a are scanned successively by the measuring head 21, whilst the measurement sections 1 to 4 of the inner surface 14 are successively scanned by the measuring head 23. In order for the measurement sections of approximately 45° to be scanned successively, the tire 10 is turned intermittently around the axis of rotation R. On conclusion of the first test stage, the complete outer surface 12 of the sidewall 11 and half of the inner surface 14 of the tread portion 15 have been tested. The tire 10 is then turned over. In the second test stage that then follows, the outer surface 12 of the then uppermost sidewall 13 is tested by the measuring heads 21, 22, and the inner surface 14 of the tread portion 15 is tested by the measuring head 23. In this process, the measurement sections 1b to 4b of the outer surface 12 are successively scanned by the measuring head 21 and the measurement sections 5b to 8b are successively scanned by the measuring head 22. At the same time the measuring head 23 successively scans the measurement sections 5 to 8 of the inner surface 14, which were not scanned during the first test stage. On conclusion of the second test stage, the tire 10 has been tested completely, that is to say bead to bead.

Figure 2A:
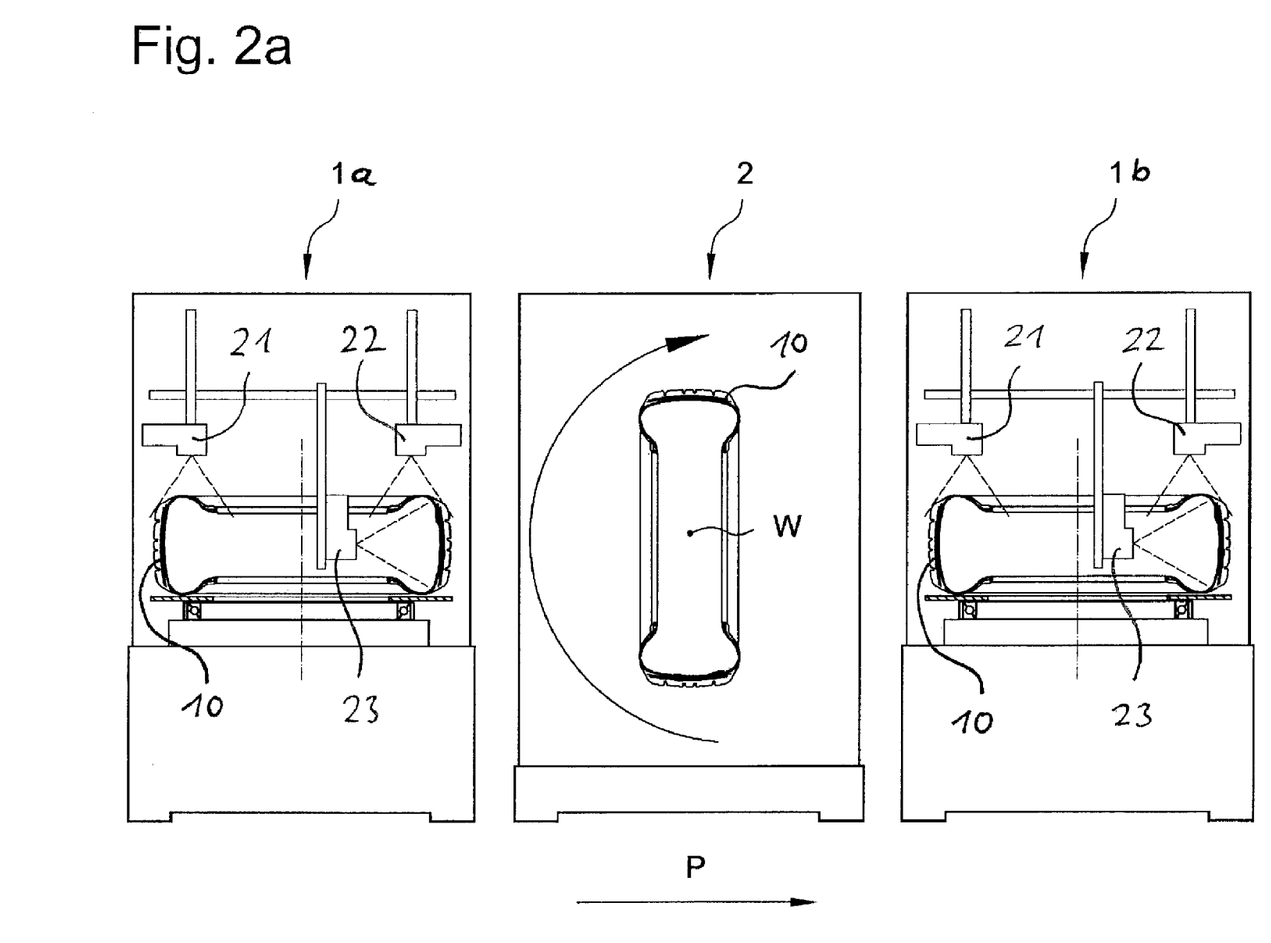
FIG. 2a, a testing arrangement comprising two test devices according to FIG. 1a and an inverting device.
Figure 2B:
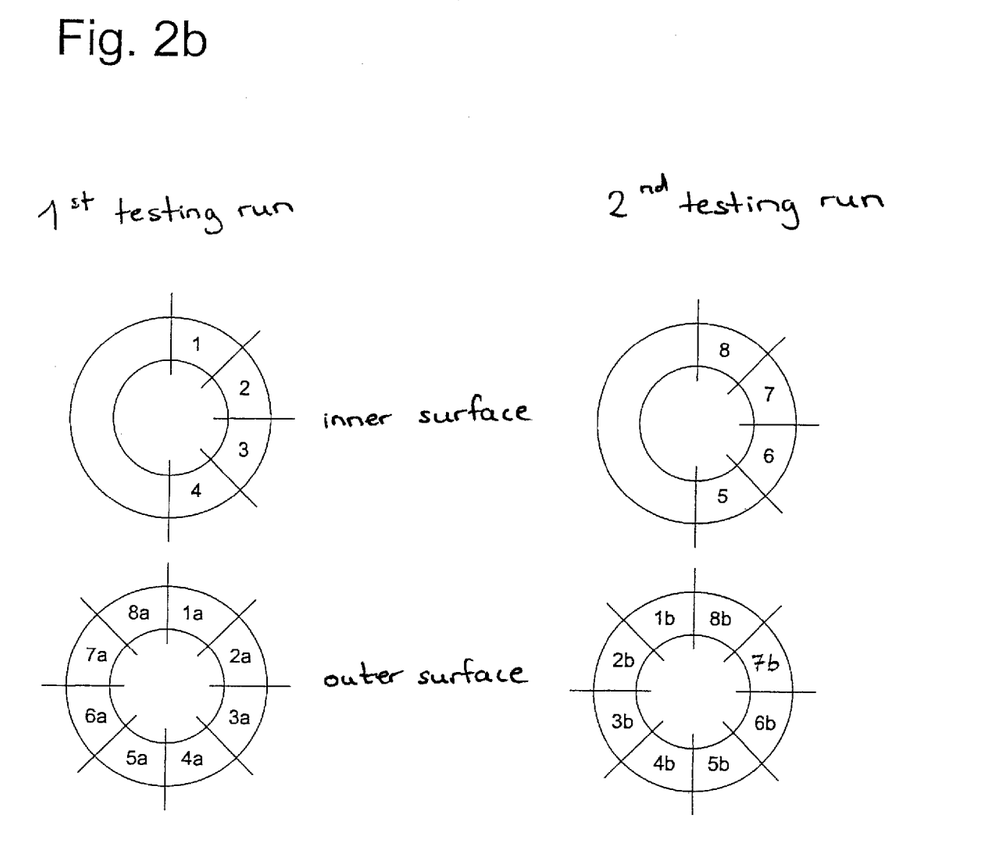

The test arrangement in FIG. 2a shows two test devices 1a, 1b, which both have the same construction as the test device 1 already described and which are arranged one after the other in a test procedure P. In the test procedure P there is an inverting device 2 arranged between the test devices 1a and 1b which enables the tire 10 to be rotated around an axis W, extending in the present case in a horizontal direction, so that the tire 10 is turned over. As can be seen in FIG. 2b, the first test stage described earlier is carried out on the first test device 1a in the test procedure P and the second test stage in the test procedure P is carried out on the second test device 1b. Accordingly, the measuring heads 21, 22, 23 of test device 1a test measurement sections 1a to 8a on the outer surface 12 of sidewall 11, and measurement sections 1 to 4 on the inner surface 14 of the tread portion 15. By contrast, after the tire 10 has been turned over by the inverting device 2, the measuring heads 21, 22, 23 of the test device 1b test the measuring sections 1b to 8b on the outer surface 12 of sidewall 13, and measurement sections 5 to 8 on the inner surface 14 of the tread portion 15. The separation of the two test stages to the test devices 1a, 1b enables the testing of a series of tires 10 to be performed unusually quickly.

Figure 3A:
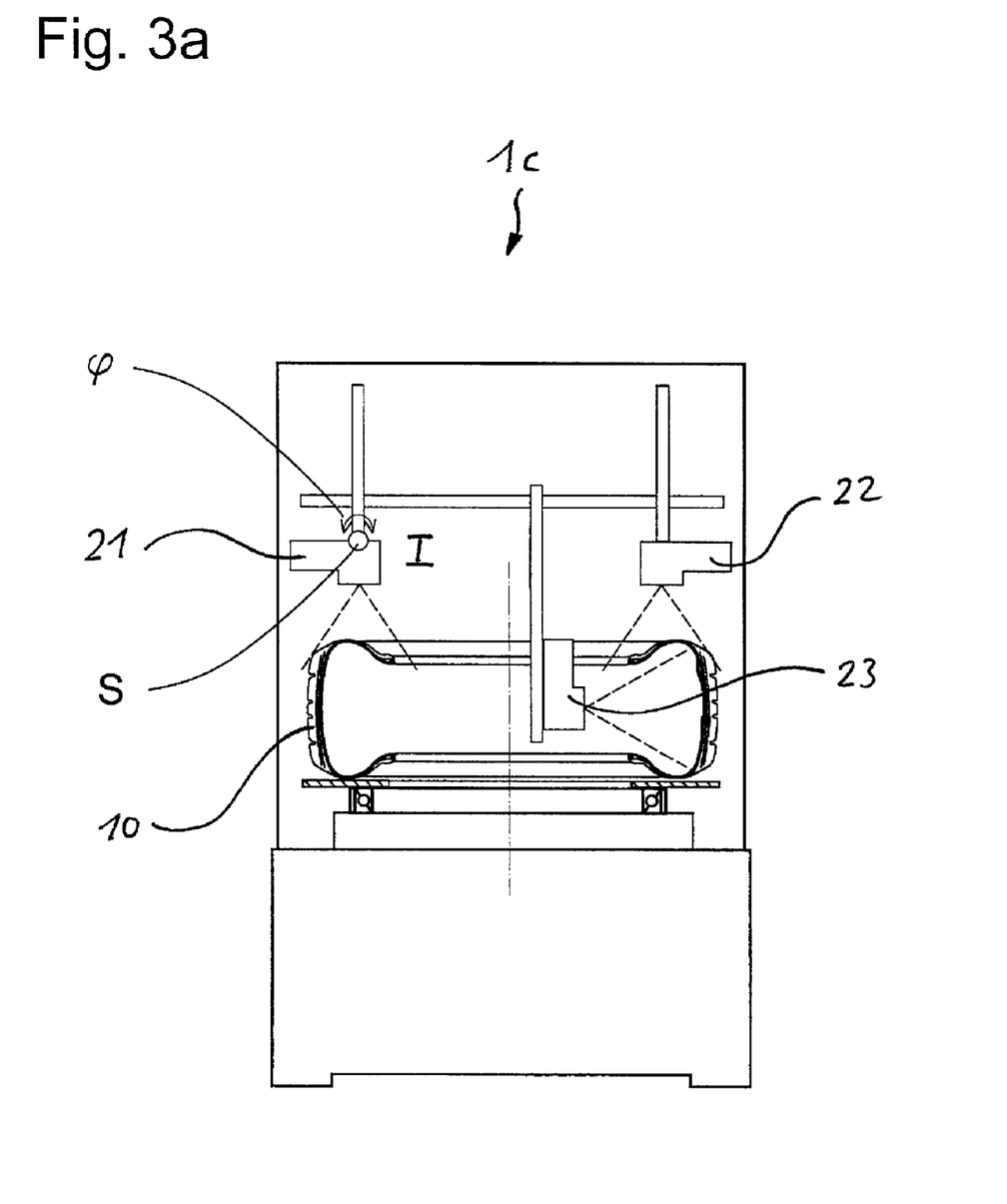
FIG. 3a, a side view of a second embodiment of the device for testing a tire which shows a rotatably mounted measuring head in a first measuring position.
Figure 3B:
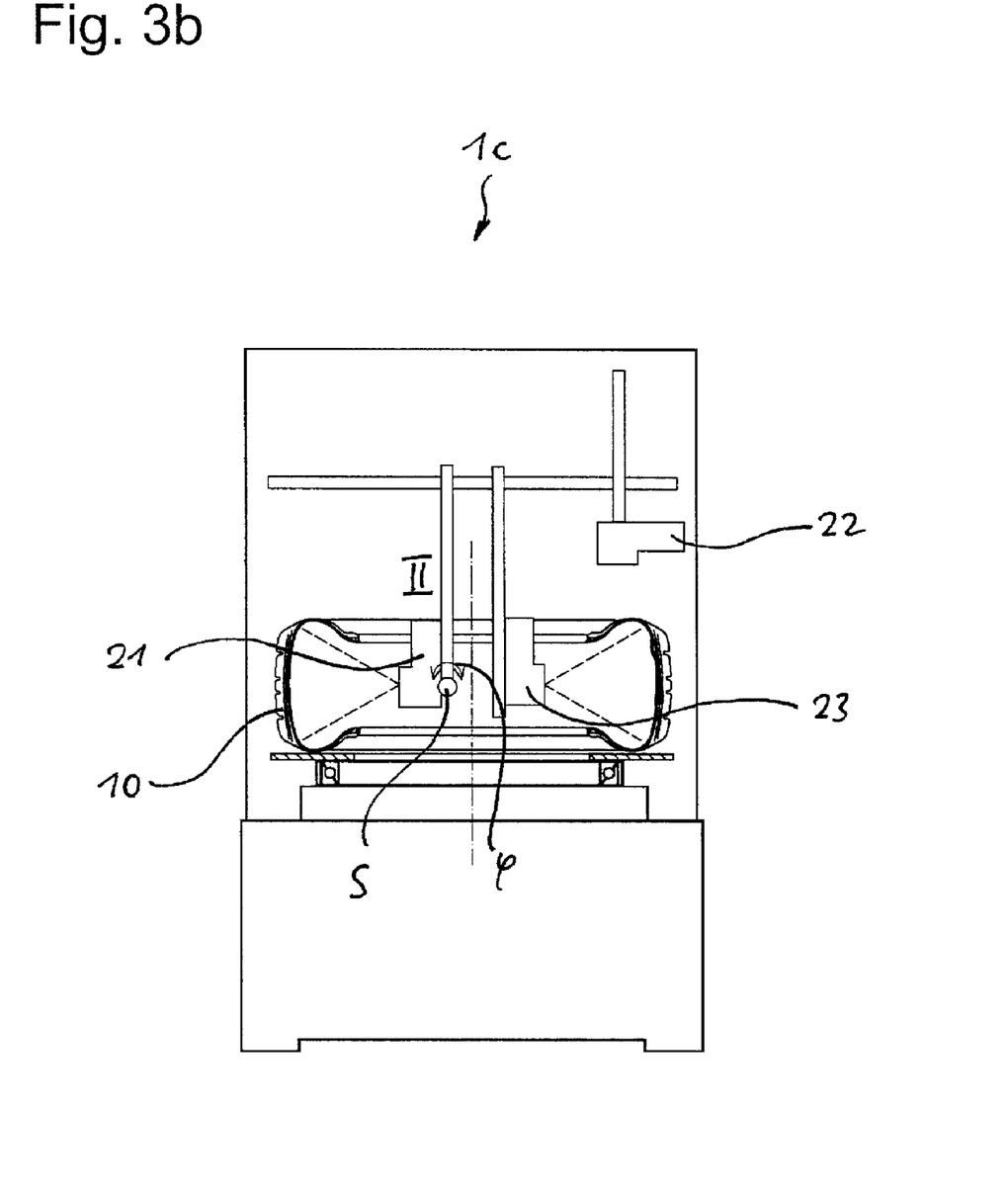
FIG. 3b, a side view according to FIG. 3a, showing the rotatably mounted measuring head in a second measuring position.

The test device 1c, depicted in FIGS. 3a and 3b, differs from test device 1 in that the measuring head 21 is rotatably mounted around an axis S. However, the measuring heads 22, 23 of the test device 1c are rigidly mounted like all the measuring heads 21, 22, 23 of test device 1 with regard to the corresponding measuring direction. As a result of the rotatable mounting, the measuring head 21 can be turned through an adjustment angle φ, which in the current case is approx. 90°. In this way it is possible to swivel the measuring head 21 between a first measuring position 1, as shown in FIG. 3a, and a second measuring position 11, as shown in FIG. 3b. In the first measuring position 1, the measuring head 21 is oriented in the axial direction z and, accordingly, is enabled to test the outer surface 12 of the sidewalls 11, 13. By contrast, in the second measuring position 11, the measuring head 21 is oriented in the radial direction r and is, accordingly, enabled to test the inner surface 14 of the tread portion 15. The rotatable arrangement of the measuring head 21 is particularly useful when the tire 10 has to be tested only, and exclusively, in the area of the tread portion 15. In such a case, as is shown in FIG. 3b, the measuring heads 21, 23 both can be arranged on the inside of the tire 10 and can be oriented in diametrically opposed directions in order to scan the tread portion 15 simultaneously in one single test stage.

Figure 4:
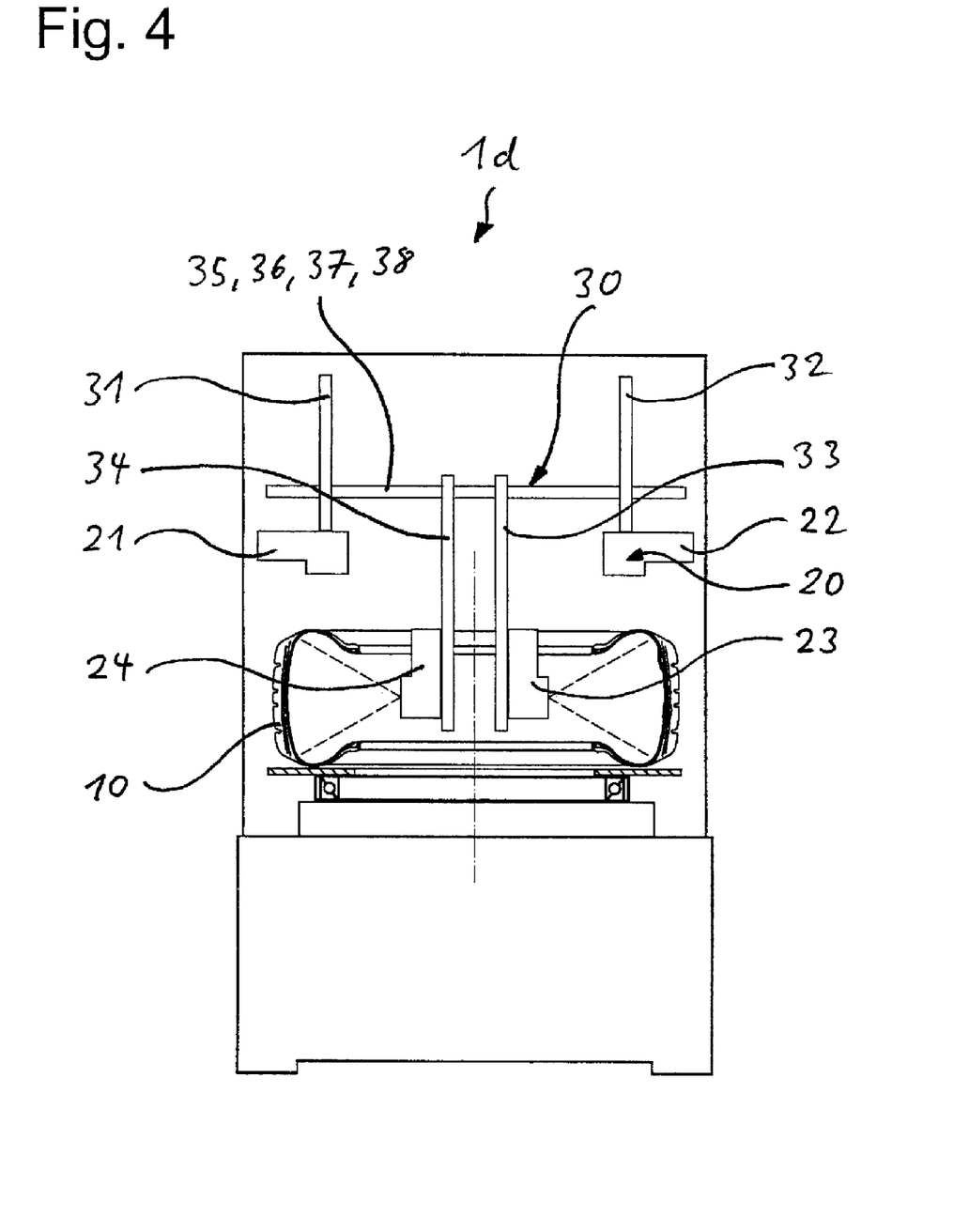
FIG. 4, a side view of a third embodiment of the device for testing a tire which has four measuring heads.

The test device 1d, shown in FIG. 4, differs from the test device 1, above all, in that the measuring unit 20 has a fourth measuring head 24. In addition, the positioning means 30 also has an axial adjustment unit 34 and a radial adjustment unit 38 to position the measuring head 24 in the desired measuring position. The measuring head 24 has the same construction as the measuring heads 21, 22, 23 and is oriented in the radial direction r diametrically opposed to the measuring head 23. In this way the inner surface 14 of the tread portion 15 can be simultaneously scanned by the measuring heads 23, 24, in order to perform a test particularly quickly.

Figure 5A:
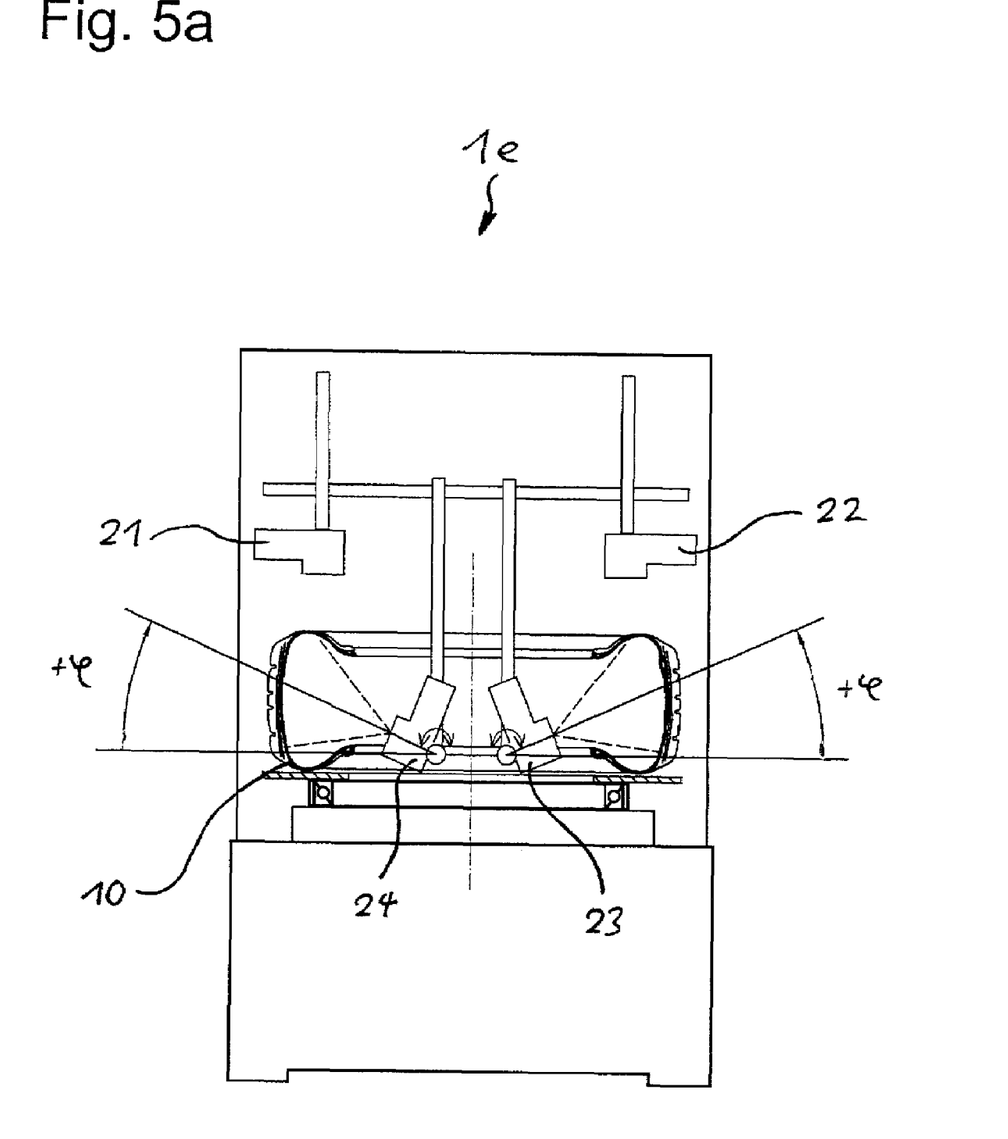
FIG. 5a, a side view of a fourth embodiment of the device for testing a tire which has two measuring heads mounted rigidly with respect to the direction of measurement and two rotatably mounted measuring heads, and FIG. 5b, a side view according to FIG. 5a, which shows the rotatably mounted measuring heads oriented in a measuring direction at a prescribed angle.
Figure 5B:
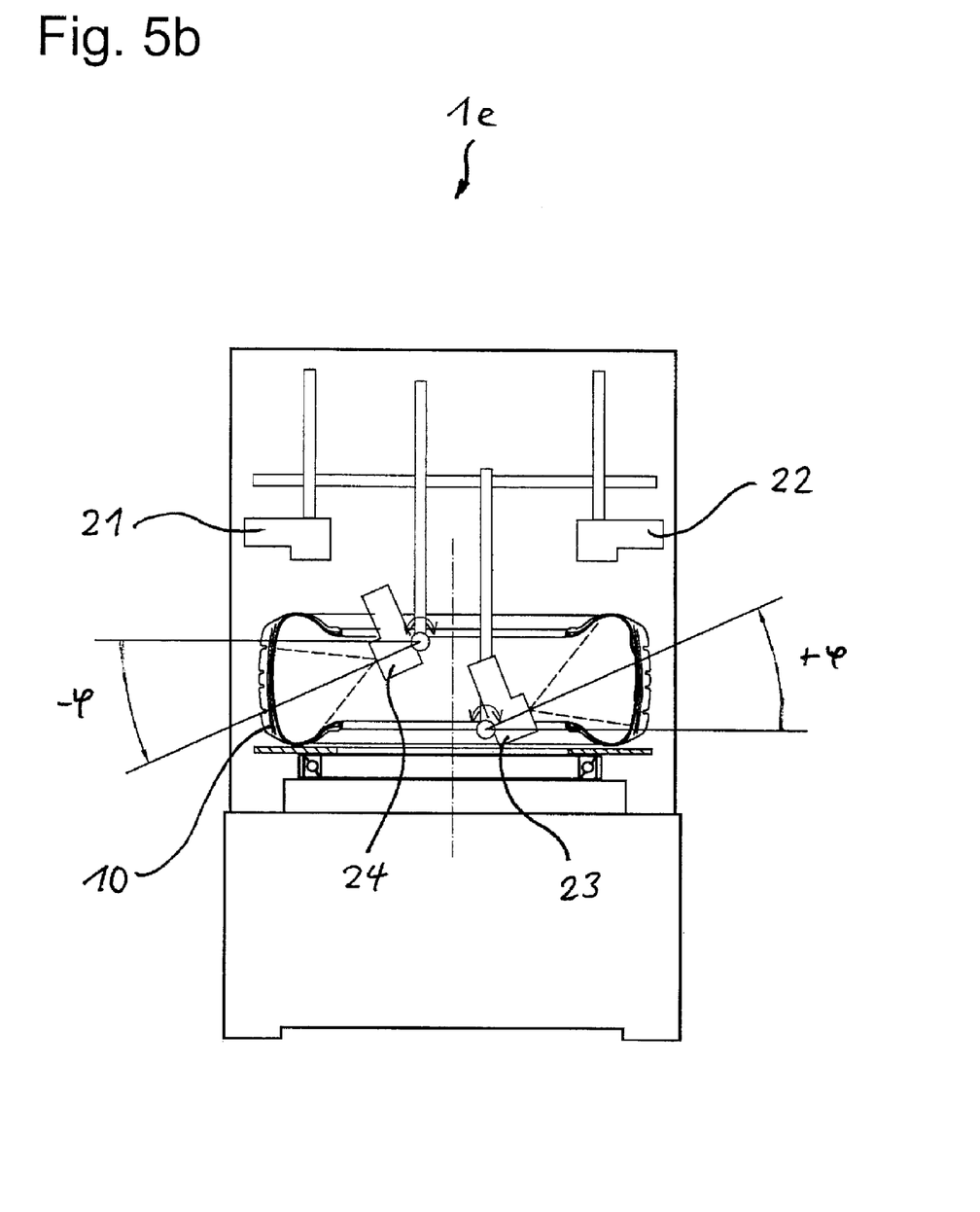

The test device 1e, shown in FIGS. 5a and 5b, differs from test device 1d in that the measuring heads 23, 24 are rotatably mounted and thus can be swiveled through the adjustment angle φ. In the present case the adjustment angle φ is approx. +/−25° relative to the tire's equatorial plane E shown in FIG. 1b or to a plane parallel to the equatorial plane E. In FIG. 5a the measuring heads 23, 24 are each turned upwards and accordingly enable a split-crown shot to be made of the tread portion 15 including the uppermost shoulder 16. In FIG. 5b the measuring head 23 is turned upwards whereas the measuring head 24 is turned downwards so that the measuring head 23 can perform a split-crown shot of the tread portion 15 including the upper shoulder 16 and the measuring head 24 can perform a split-crown shot of the tread portion 15 including the lower shoulder 16. The rotatable arrangement of the measuring heads 23, 24 is of particular advantage above all when the tire to be tested 10 is comparatively broad and/or has a narrow jaw opening so that the tread portion 15 cannot be completely covered by the optical angle α of the measuring heads 23, 24 when oriented in the radial direction r.

The embodiments of a device for testing a tire 10 explained above are distinctive because they permit a complete test of the tire 10 to be performed quickly. The test devices 1, 1a, 1b, 1c have only three measuring heads 21, 22, 23 and thus have an optimal configuration for testing a tire completely by carrying out the method according to the invention. The test devices 1d, 1e, which have four measuring heads 21, 22, 23, 24, also enable the method according to the invention to be carried out, yet by virtue of the fourth measuring head 24, not only create a redundancy which contributes to greater fail-safe operation but also enable a variety of different procedural approaches to be implemented according to requirements. Finally, the rigid arrangement of most of the measuring heads 21, 22, 23, 24 of the test devices 1, 1a, 1b, 1c, 1d, 1e helps to contribute to a simple and low-cost configuration which also causes little wear and requires little maintenance.

LIST OF REFERENCES

| | |
|---|---|
| 1 | Test device |
| 1a | Test device |
| 1b | Test device |
| 1c | Test device |
| 1d | Test device |
| 1e | Test device |
| 2 | Inverting device |
| 10 | Tire |
| 11 | Sidewall |
| 12 | Outer surface |
| 13 | Sidewall |
| 14 | Inner surface |
| 15 | Tread portion |
| 16 | Shoulder |
| 17 | Bead |
| 18 | Carcass |
| 19 | Belt |
| 20 | Measuring unit |
| 21 | Measuring head |
| 22 | Measuring head |
| 23 | Measuring head |
| 24 | Measuring head |
| 30 | Positioning means |
| 31 | Axial adjustment means |
| 32 | Axial adjustment means |
| 33 | Axial adjustment means |
| 34 | Axial adjustment means |
| 35 | Radial adjustment means |
| 36 | Radial adjustment means |
| 37 | Radial adjustment means |
| 38 | Radial adjustment means |
| 40 | Pressure chamber |
| 50 | Sub-frame |
| 51 | Rotation device |
| E | Equatorial plane |
| P | Test stage/procedure |
| R | Axis of rotation |
| S | Swivel axis |
| W | Turning axis |
| r | Radial direction |
| z | Axial direction |
| α | Optical angle |
| φ | Adjustment angle |
| I | Measuring position |
| II | Measuring position |

The invention claimed is:

1. A device for testing a tire having a first sidewall, a second sidewall and a tread portion by means of an interferometric measuring method, wherein each of the first sidewall, the second sidewall and the tread portion have an outer surface and an inner surface, comprising:
a measuring unit configured to generate a measurement result;
a positioning means configured to position the measuring unit; and
an inverting device configured to turn over the tire between a first test stage and a second test stage;
wherein the measuring means comprises:
a first measuring head oriented in a first measuring direction, the first measuring head being configured to scan a part of the outer surface of the first sidewall in the first test stage and a part of the outer surface of the second sidewall in the second test stage;
a second measuring head oriented in a second measuring direction, the second measuring head being configured to scan the remaining part of the outer surface of the first sidewall in the first test stage and the remaining part of the outer surface of the second sidewall in the second test stage; and
a third measuring head oriented in a third measuring direction, the third measuring head being configured to scan a part of the inner surface of at least the tread portion in the first test stage and the remaining part of the inner surface of at least the tread portion in the second test stage.

2. A device according to claim 1 in which the measuring unit comprises a fourth measuring head configured to scan the inner surface of at least the tread portion oriented in a fourth measuring direction (r).

3. A device according to claim 1 in which the first measuring direction and the second measuring direction run in an axial direction (z) of the tire.

4. A device according to claim 1 in which the third measuring direction and/or the fourth measuring direction run in a radial direction (r) of the tire and are preferably oriented in opposing directions.

5. A device according to claim 4 in which the axial direction (z) runs vertically and the radial direction (r) runs horizontally.

6. A device according to claim 1 in which at least one of the measuring heads, preferably all of the measuring heads, are rigidly arranged in relation to the measuring direction (r, z).

7. A device according to claim 1 in which at least one of the measuring heads, preferably all of the measuring heads, can be turned around a swivel axis (S) running orthogonal to the measuring direction (r, z).

8. A device according to claim 7 in which only one of the measuring heads can be turned around the swivel axis (S).

9. A device according to claim 7 in which the measuring head can be turned between a first measuring position and a second measuring position, wherein the measuring head can be turned from the first measuring position into the second measuring position against the effect of a return force.

10. A device according to claim 9 in which the measuring head in the first measuring position is oriented in an axial measuring direction (z) and the measuring head in the second measuring position is oriented in a radial measuring direction (r).

11. A device according to claim 9 in which the measuring head in the first measuring position (I) is oriented in a radial measuring direction (r) and the measuring head in the second measuring position (II) is oriented in a measuring direction at an adjustment angle ($\phi$) to the radial measuring direction (r).

12. A device according to claim 11 in which the adjustment angle ($\phi$) is between 0° and +/−30°, preferably between 0° and +/−15°.

13. A device according to claim 1 including a pressure chamber in which the tire can be subjected to a prescribed pressure.

14. A device according to claim 1 including a sub-frame on which the tire can be placed.

15. A device according to claim 14 in which the positioning means and/or the pressure chamber are supported on the sub-frame.

16. A device according to claim 1 in which at least one of the measuring heads can be moved in the axial direction (z) and/or in the radial direction (r) by the positioning means.

17. A device according to claim 16 in which the positioning means has at least one axial adjustment unit, by means of which the measuring head is configured to be moved in the axial direction (z), and at least one radial adjustment unit, by means of which the measuring head is configured to be moved in the radial direction (r).

18. A device according to claim 17 including at least two axial adjustment units and/or at least two radial adjustment units which are linked to each other.

19. A device according to claim 1 in which the measuring unit is configured to be rotated relative to the tire around an axis of rotation (R) extending in an axial direction of the tire.

20. A device according to claim 19 in which the sub-frame is provided with a rotation device configured to turn the tire around the axis of rotation (R).

21. A device according to claim 1 in which the measuring heads each comprise:
 a lighting element for illuminating the tire;
 a shearing element configured to cause the light beams reflected from the tire to produce interference, and
 an electronic image sensor arranged within the optical path of the shearing element which records the interfering light beams.

22. A device according to claim 1 including a control and evaluation unit configured to control the measuring unit and/or the positioning means and/or the rotation device and/or the pressure prevailing in the pressure chamber and configured to evaluate the measurement results.

23. A device according to claim 22 in which the control and evaluation unit has a frame grabber configured to store the images captured by the image sensors of the measuring heads, wherein the frame grabber is preferably capable of storing the images simultaneously.

24. A testing arrangement for testing a tire, in particular by means of an interferometric measuring method, comprising
 at least two test devices according to claim 1 which are arranged one after the other in a test procedure, and
 an inverting device, which is capable of turning over the tire;
 wherein the inverting device is arranged in the test procedure between the test devices.

25. A method for testing a tire by means of at least one test device according to claim 1, comprising the following procedural steps:
 a) a tire to be tested having a first sidewall, a second sidewall and a tread portion, which are divided into a number of measurement sections, is arranged in the test device
 b) the first measuring head is positioned in a measuring position and oriented in a first measuring direction (z) to scan the outer surface of the sidewalls;
 c) the second measuring head is positioned in a measuring position and oriented in a second measuring direction (z) to scan the outer surface of the sidewalls;
 d) the third measuring head is positioned in a measuring position and oriented in the third measuring direction (z) to scan the inner surface of at least the tread portion;
 e) in a first test stage, the tire is turned intermittently around the axis of rotation (R) in relation to the measuring heads and is scanned by the measuring heads section by section, wherein
  the first measuring head scans a part of the measurement sections on the outer surface of the first sidewall,
  the second measuring head scans the remaining part of the measurement sections on the outer surface of the first sidewall and
  the third measuring head scans a part of the measurement sections on the inner surface of at least the tread portion;
 f) the tire is turned over;
 g) in a second test stage, the tire is turned intermittently around the axis of rotation (R) in relation to the measuring heads and is scanned by the measuring heads section by section, wherein
  the first measuring head scans a part of the measurement sections on the outer surface of the second sidewall,
  the second measuring head scans the remaining part of the measurement sections on the outer surface of the second sidewall and
  the third measuring head scans the remaining part of the measurement sections on the inner surface of at least the tread portion.

26. A method according to claim 25 including an even number of measurement sections.

27. A method according to claim 25 in which the first test stage is carried out on a first test device and the second test stage is carried out on a second test device.

28. A method according to claim 25 in which the measurement sections are scanned simultaneously by the measuring heads.

29. A method according to claim 25 in which the tire is placed in a pressure chamber and is subjected to a prescribed pressure.

30. A method according to claim 29 in which the measuring heads capture an interferometric record of a deformation of the tire arising as a result of a change in the pressure in the pressure chamber.

* * * * *